US008410656B2

(12) United States Patent
Lokhandwalla et al.

(10) Patent No.: US 8,410,656 B2
(45) Date of Patent: Apr. 2, 2013

(54) SEGMENTED STATOR ASSEMBLY

(75) Inventors: Murtuza Lokhandwalla, Clifton Park, NY (US); James Pellegrino Alexander, Ballston Lake, NY (US); Ayman Mohamed Fawzi El-Refaie, Niskayuna, NY (US); Manoj Ramprasad Shah, Latham, NY (US); Owen Scott Quirion, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/609,652

(22) Filed: Oct. 30, 2009

(65) Prior Publication Data

US 2011/0101818 A1 May 5, 2011

(51) Int. Cl.
*H02K 1/16* (2006.01)

(52) U.S. Cl. .......................... 310/216.101; 310/216.102

(58) Field of Classification Search ........... 310/216.091, 310/216.098, 216.101–216.106, 214, 216.99, 310/216.099
See application file for complete search history.

(56) References Cited

U.S. PATENT DOCUMENTS

| 905,817 | A | * | 12/1908 | Howell | 310/216.084 |
|---|---|---|---|---|---|
| 1,031,316 | A | * | 7/1912 | Apple | 310/216.104 |
| 1,042,408 | A | * | 10/1912 | Dearborn | 310/214 |
| 1,279,643 | A | * | 9/1918 | Brown | 310/194 |
| 2,015,554 | A | * | 9/1935 | Fisher | 310/214 |
| 2,451,633 | A | * | 10/1948 | Perrigo | 310/214 |
| 3,257,572 | A | * | 6/1966 | Heilmann et al. | 310/190 |
| 3,334,252 | A | * | 8/1967 | Gayral | 310/214 |
| 3,797,106 | A | * | 3/1974 | Costello | 29/598 |
| 3,869,629 | A | * | 3/1975 | Ogawa et al. | 310/216.069 |
| 4,912,353 | A | * | 3/1990 | Kondo et al. | 310/216.102 |
| 5,698,917 | A | * | 12/1997 | Shultz | 310/87 |
| 6,064,132 | A | * | 5/2000 | Nose | 310/216.102 |
| 6,487,769 | B2 | | 12/2002 | Ketterer et al. | |
| 6,611,076 | B2 | * | 8/2003 | Lindbery et al. | 310/216.004 |
| 6,809,442 | B2 | * | 10/2004 | Kaneko et al. | 310/58 |
| 6,815,861 | B2 | * | 11/2004 | Suzuki et al. | 310/216.101 |
| 7,321,176 | B2 | * | 1/2008 | Strothmann | 310/156.15 |
| 7,348,706 | B2 | | 3/2008 | Ionel et al. | |
| 7,471,025 | B2 | | 12/2008 | Sheeran et al. | |
| 2007/0252471 | A1 | | 11/2007 | Holmes et al. | |
| 2011/0037338 | A1 | * | 2/2011 | Leiber et al. | 310/215 |

FOREIGN PATENT DOCUMENTS

JP      57189542 A    * 11/1982

* cited by examiner

*Primary Examiner* — Dang Le
(74) *Attorney, Agent, or Firm* — Marie-Claire Maple

(57) ABSTRACT

An electric machine and stator assembly are provided that include a continuous stator portion having stator teeth, and a tooth tip portion including tooth tips corresponding to the stator teeth of the continuous stator portion, respectively. The tooth tip portion is mounted onto the continuous stator portion.

17 Claims, 4 Drawing Sheets

SEGMENTED STATOR ASSEMBLY

STATEMENT REGARDING FEDERALLY SPONSORED RESEARCH AND DEVELOPMENT

This invention was made with Government support under contract number DE-FC26-07NT43122 awarded by U.S. Department of Energy. The Government has certain rights in the invention.

BACKGROUND

Electric machines such as IPM motors or generators have been widely used in a variety of applications including aircraft, automobiles and industrial usage. IPM machines are currently being developed for use in hybrid automotive applications. A demand for lightweight and high power density IPM machines has resulted in the design of higher speed motors and generators to maximize the power to weight ratios. Hence, the trend is increasing acceptance of IPM machines offering high machine speed, high power density, and reduced mass and cost.

Conventional electric machines (e.g., motors and generators) include a stator assembly that includes a laminated steel section known as yoke or back iron having the primary purpose of carrying the electromagnetic flux, but also providing structural rigidity to resist electromagnetic forces. The yoke section includes radial sections, known as stator teeth. The stator teeth sometimes include flared tooth tips. This flared shape allows channeling of the flux appropriately and improves the machine electromagnetic performance. However, at the same time the flared tooth tips also impair the ability to wind a coil around the tooth. As a consequence, segmented stator structures have been developed to provide for a greater fill factor for the windings. Segmented stator structures typically involve segmenting the yoke section to enable greater access to the stator teeth to increase the slot copper fill factor. While the segmented stator structures enable greater fill factors, they are difficult to manufacture and have reduced performance due to flux leakage where the segmented portions are joined. In addition, segmenting the yoke section results in reduced structural integrity of the stator assembly For these and other reasons, there is a need for the present invention.

SUMMARY

An electric machine and stator assembly are provided that include a continuous stator portion having stator teeth, and a tooth tip portion including tooth tips corresponding to the stator teeth of the continuous stator portion, respectively. The tooth tip portion is mounted onto the continuous stator portion.

BRIEF DESCRIPTION OF THE DRAWINGS

The nature and various additional features of the invention will appear more fully upon consideration of the illustrative embodiments of the invention which are schematically set forth in the figures. Like reference numerals represent corresponding parts.

DETAILED DESCRIPTION

Embodiments of the present invention will be explained in further detail by making reference to the accompanying drawings, which do not limit the scope of the invention in any way.

Figure 1:
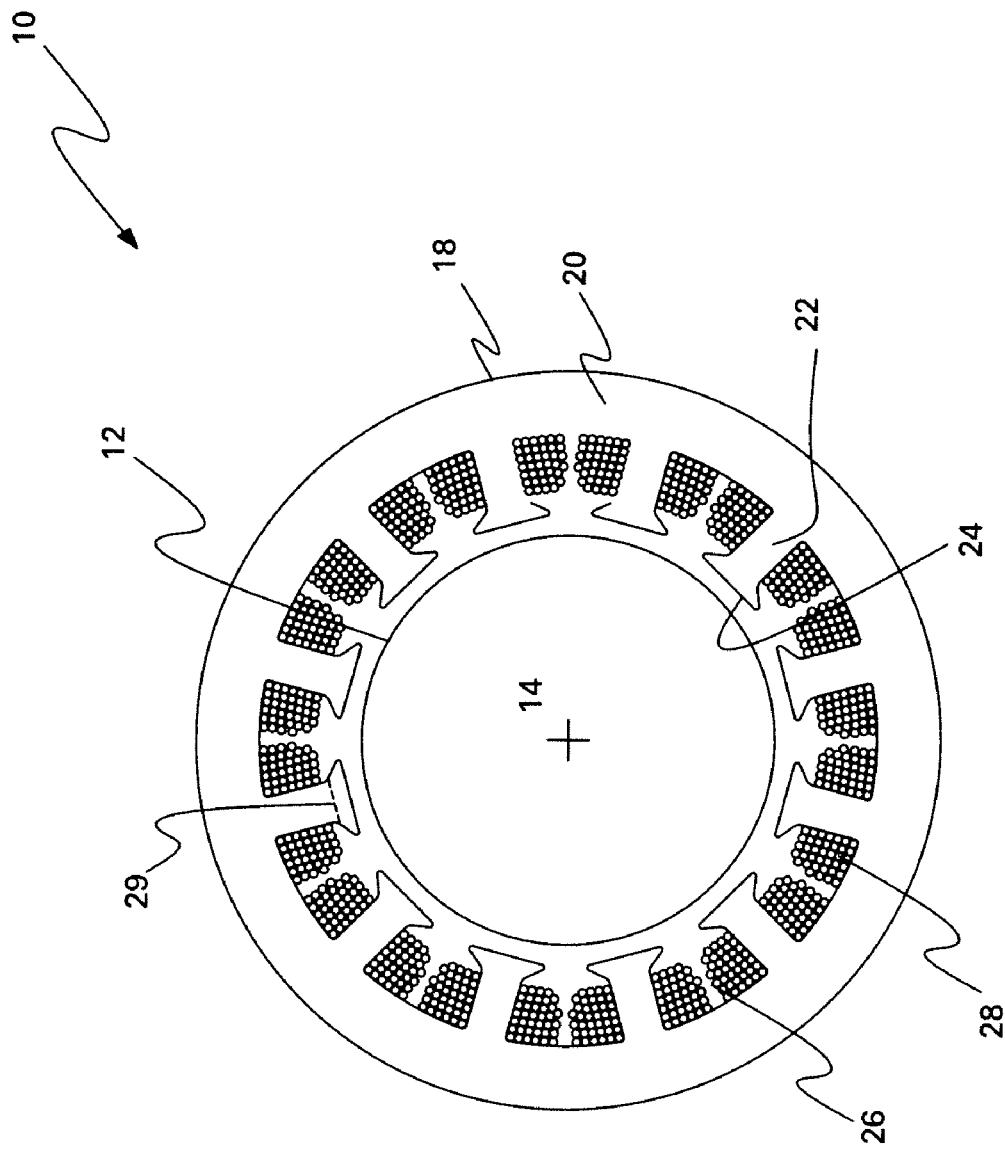
FIG. 1 illustrates a cross-sectional view of an electric machine.

FIG. 1 illustrates a cross-sectional view of an electric machine 10 such as an electric motor or generator, for example. The machine 10 includes a rotor assembly 12 that is configured to rotate about a longitudinal axis 14. The machine 10 further includes a stator assembly 18 including a yoke or back iron 20 and stator teeth 22. The stator teeth 22 each include a tooth tip 24. The stator assembly 18 includes multiple stator slots 26 for concentrated windings 28, where the coil is wound around a stator tooth 22. The stator assembly 18 generates a magnetic field and extends along the longitudinal axis 14.

Embodiments of the invention provide for segmenting the stator tooth tips from the stator teeth, as shown by the dotted line 29 in FIG. 1. Segmenting the tooth tips from the stator teeth allows for a higher packing factor for the concentrated windings without sacrificing rigidity of the yoke or back iron. The tooth tips are mounted onto the stator teeth following winding of the coils. The tooth tips shown in the exemplary embodiments of the invention discussed herein show flared tooth tips, which are desirable for increasing machine power density. However, the tooth tips can have any shape or size suitable to the application.

Figure 2:
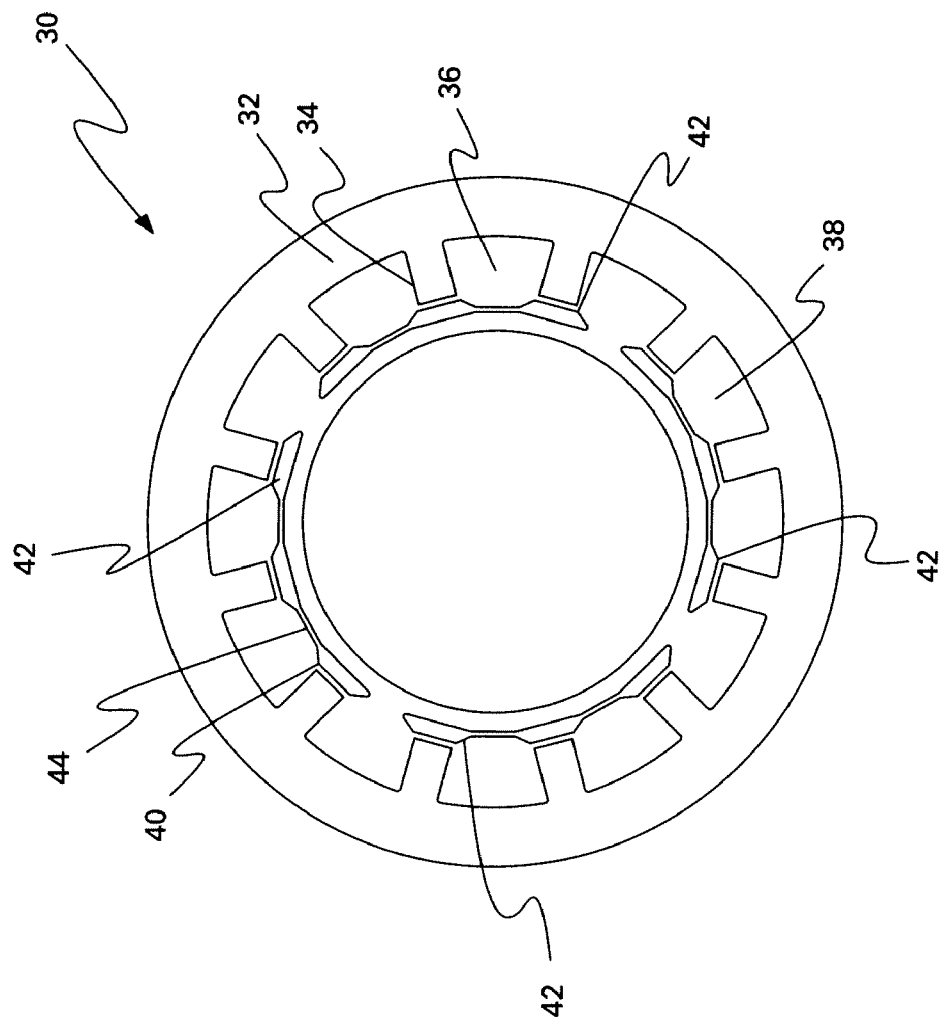
FIG. 2 illustrates a cross-sectional view of a stator assembly according to an exemplary embodiment of the present invention.

FIG. 2 shows a cross-sectional view of a stator assembly according to an exemplary embodiment of the invention. The assembly 30 includes a continuous yoke 32 with multiple stator teeth 34 arranged circumferentially forming a cavity 36. The stator teeth 34 form slots 38 in which the concentrated windings are housed. In this embodiment, the tooth tips 40 are segmented from the teeth 34. Each tooth tip 40 is mounted to the associated tooth 34 after the coil is wound. In one embodiment, the concentrated windings 28 include copper coils. The tooth tips 40 can be attached to the teeth 34 mechanically by providing 'V' shaped grooves or a dovetail joint, in the tooth tips 40, by using glue or epoxy, or by any other suitable mounting means.

In the exemplary embodiment shown, the stator assembly 30 includes multiple segmented tooth tip portions 42. Each segmented tooth tip portion 42 includes three tooth tips 40. However, the invention is not limited in this regard. The segmented tooth tip portions 42 can include any number of tooth tips 40. The tooth tips 40 in each of the segmented tooth tip portions 42 are coupled together by a bridge portion 44. The segmented tooth tip portions 42 are mounted to the stator teeth 34 following winding of the coils. The segmented tooth tip portions 42 are mounted to the stator teeth 34 by any suitable means. Each segmented tooth tip portion 42 can be formed as a single continuous structure including the tooth tips 40 and the bridge portions 44. In the embodiment shown, the bridge portions 44 have a thickness that is less than the thickness of the tooth tips 40. However, the tooth tips 40 and bridge portions 44 can be of any suitable shape, thickness, and size. In the exemplary embodiment shown, the segmented tooth tip portions 42 are separated from each other by an air gap. However, the segmented tooth tip portions 42 can be coupled together by a bridge structure (not shown) by any suitable means such as adhesive, male and female connectors, etc. The bridge structure can be formed of a non-magnetic material, a bi-state material, a soft magnetic composite, or any other suitable material.

According to one embodiment of the invention, the segmented tooth tip portions 42 are formed from silicon steel laminations, which could be either glued or mechanically fastened into a single integral piece. According to another embodiment of the invention, the segmented tooth tip portions 42 are formed from a bi-state material. The bridge portions 44 are heat treated so that the bridge portions 44 become non-magnetic. In another exemplary embodiment, the segmented tooth tip portions 42 are formed of a soft magnetic composite material and formed into the desired shape. The segmented tooth tip portions 42 can be formed from any material having the desired characteristics for stator application. As shown in FIG. 2, the segmented tooth tip portions 42 are separated by an air gap. However, according to another embodiment (not shown) the segmented tooth tip portions 42 are joined together by a wedge or bridge structure. The bridge structure is formed from a non-magnetic material, a bi-state material, or any other suitable material.

Figure 3:
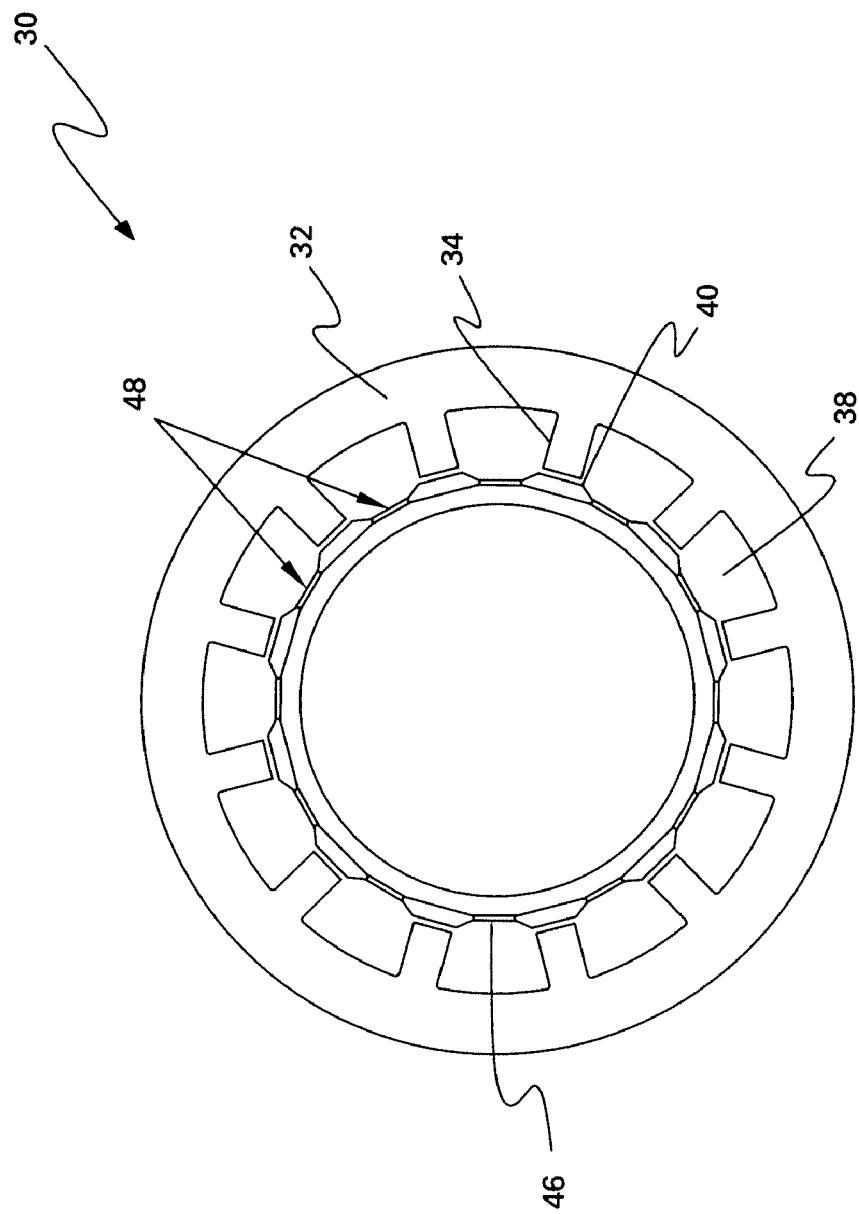
FIG. 3 illustrates a cross-sectional view of a stator assembly according to another exemplary embodiment of the present invention.

FIG. 3 shows a cross-sectional view of a stator assembly according to yet another embodiment of the invention. In this embodiment, all of the tooth tips 40 are combined into a single piece or structure 46. The single, continuous structure 46 can be formed from multiple materials or from one material. The structure 46 can be formed as one piece or integrated segments. The tooth tips 40 of the structure 46 are arranged opposite the stator teeth 34, and the portions coupling the tooth tips together are bridge portions 48.

In one embodiment, the bridge portions 48 are formed from non-magnetic material such as a glass fiber epoxy composite, or a plain epoxy with laminations embedded in the epoxy to serve as tooth tips 40. In another embodiment, a bi-state magnetic material is used to form the single structure 46. In this embodiment, the regions representing the slot openings or bridges 48 are heat-treated to become non-magnetic. Additionally, the single structure 48 can be formed from a soft magnetic composite material, or any other suitable material. The single, continuous structure 46 is mounted to the stator teeth 34 after the coils are wound. A nominal radial interference between the outer surface of this single structure, 46, and the inner surface of the stator teeth 34 could be utilized to hold the structure in place. Additional 'V' grooves on the outer surface of the tooth tips 40 can be utilized to orient and lock this structure relative to the stator. As noted above, any suitable mounting means can be used.

Figure 4:
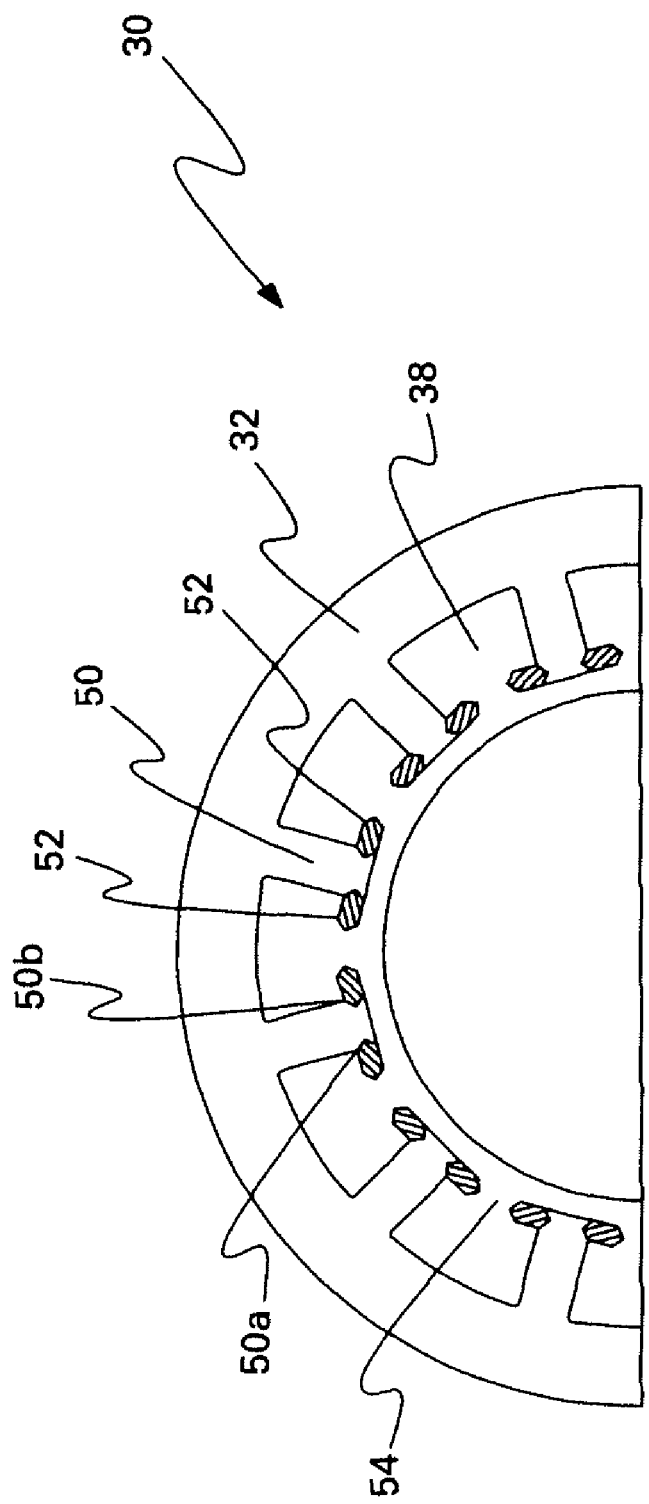
FIG. 4 illustrates a cross-sectional view a stator assembly according to another exemplary embodiment.

A cross-sectional view of stator assembly according to another embodiment of the invention is shown in FIG. 4. The assembly 30 includes the yoke 32 and stator teeth 50. Each of the stator teeth 50 includes notches or recess portions 50a, 50b at an end opposite the yoke 32. The recess portions 50a and 50b on either side of each stator tooth 50 receives a flare portion 52. The flare portions 52 are secured to the stator teeth 50 following winding of the coils. The flare portions 52 allow channeling of the flux and improve the electromagnetic performance of the assembly. In one embodiment, the flare portions 52 are formed of the same material as the stator teeth 50, such as a bi-state material or a soft magnetic composite, for example. However, the flare portions 52 can be formed from any material suitable for the desired flux flow and electromagnetic performance. The tooth tip portions, including the recess portions 50a, 50b and the flare portions 50, are separated by an air gap 54.

In another embodiment, the recess portions 50a and 50b receive bridge portions 54 that couple the stator teeth 50 together to form a closed loop structure, as shown in FIG. 4.

According to one embodiment, the bridge portions 54 are made from a bi-state material. Any other material suitable for flux channeling and electromagnetic performance can be used.

In the embodiments disclosed herein, a stator assembly includes various arrangements for separating the tooth tip portion or portions from the stator teeth of a stator assembly to provide for increased accessibility to a stator-slot area allowing a higher number of concentrated windings around the stator teeth. The tooth tip portion or portions is then secured to the stator teeth. This arrangement provides for improved power density of the IPM machine in which the stator assembly is used without sacrificing the mechanical integrity of the stator assembly.

The electric machines discussed herein may be well suited for hybrid applications. However, such machines may be employed in a variety of other applications. One of them includes aviation applications, such as in aircraft engines. The machines can also be used for other non-limiting examples such as traction applications, wind and gas turbines, starter-generators for aerospace applications, industrial applications and appliances, for example.

While the invention has been described in terms of various specific embodiments, those skilled in the art will recognize that the invention can be practiced with modification within the spirit and scope of the claims.

What is claimed is:

1. A stator assembly, comprising:
   a continuous stator portion having a plurality of stator teeth;
   a tooth tip portion comprising a plurality of tooth tips radially opposed to corresponding stator teeth of the continuous stator portion, respectively, wherein the tooth tip portion is mounted onto the continuous stator portion to join the tooth tips to the radially opposed corresponding stator teeth;
   wherein the tooth tip portion comprises a continuous tooth tip structure formed from a single, continuous material; and
   wherein the continuous tooth tip structure is formed from a bi-state material, wherein bridge portions arranged between the tooth tips are non-magnetic following a heat treatment.

2. The stator assembly of claim 1, wherein the tooth tip portion is mounted onto the continuous stator portion by one of an adhesive, mechanical fastening, interference fit, or dovetails.

3. A stator assembly, comprising:
   a continuous stator portion having a plurality of stator teeth;
   a tooth tip portion comprising a plurality of tooth tips radially opposed to corresponding stator teeth of the continuous stator portion, respectively, wherein the tooth tip portion is mounted onto the continuous stator portion to join the tooth tips to the radially opposed corresponding stator teeth;
   wherein the tooth tip portion is segmented into tooth tip segments each comprising two or more tooth tips, wherein the tooth tip segments are mounted onto the continuous stator portion.

4. The stator assembly of claim 3, wherein the tooth tip segments comprise bridge portions disposed between the tooth tips.

5. The stator assembly of claim 4, wherein the tooth tip segments and the bridge portions are formed from a bi-state material, wherein the bridge portions are non-magnetic following a heat treatment.

6. The stator assembly of claim 4, wherein the tooth tip segments and the bridge portions are formed from a soft magnetic composite material.

7. The stator assembly of claim 4, wherein the tooth tip portion further comprises bridge structures coupling adjacent tooth tip segments together.

8. The stator assembly of claim 7, wherein the bridge structures are formed from a non-magnetic material.

9. The stator assembly of claim 7, wherein the bridge structures are formed from a bi-state material.

10. An electric machine, comprising:
   a stator assembly comprising:
      a continuous stator portion having a plurality of stator teeth; and
      a tooth tip portion comprising a plurality of tooth tips radially opposed to corresponding stator teeth of the continuous stator portion, respectively, wherein the tooth tip portion is mounted onto the continuous stator portion to join the tooth tips to the radially opposed corresponding stator teeth;
      wherein the tooth tip portion comprises a continuous tooth tip structure formed from a single, continuous material;
      wherein the continuous tooth tip structure comprises the tooth tips and bridge portions disposed between the tooth tips, and wherein the continuous tooth tip structure is formed from a bi-state material, wherein the bridge portions are non-magnetic following a heat treatment.

11. The electric machine of claim 10, wherein the tooth tip portion is mounted onto the continuous stator portion by one of an adhesive, mechanical fastening, interference fit, or dovetails.

12. An electric machine, comprising:
   a stator assembly comprising:
      a continuous stator portion having a plurality of stator teeth; and
      a tooth tip portion comprising a plurality of tooth tips radially opposed to corresponding stator teeth of the continuous stator portion, respectively, wherein the tooth tip portion is mounted onto the continuous stator portion to join the tooth tips to the radially opposed corresponding stator teeth;
   wherein the tooth tip portion is segmented into tooth tip segments each comprising two or more tooth tips, wherein the tooth tip segments are mounted onto the continuous stator portion.

13. The electric machine of claim 12, wherein the tooth tip segments comprise bridge portions disposed between the tooth tips.

14. The electric machine of claim 13, wherein the tooth tip segments and the bridge portions are formed from a bi-state material, wherein the bridge portions are non-magnetic following a heat treatment.

15. The electric machine of claim 13, wherein the tooth tip segments and the bridge portions are formed from a soft magnetic composite material.

16. The electric machine of claim 13, wherein the tooth tip portion further comprises bridge structures coupling adjacent tooth tip segments together.

17. The electric machine of claim 16, wherein the bridge structures are formed from a non-magnetic material.

* * * * *